(12) United States Patent
Vaitekunas

(10) Patent No.: US 9,915,506 B1
(45) Date of Patent: Mar. 13, 2018

(54) SYSTEM AND METHOD OF COORDINATED INFRARED SUPPRESSION AND FLARE LAUNCH

(71) Applicant: W.R. DAVIS ENGINEERING LIMITED, Ottawa (CA)

(72) Inventor: David Anthony Vaitekunas, Ottawa (CA)

(73) Assignee: W.R. Davis Engineering Limited, Ottawa, Ontario (CA)

( * ) Notice: Subject to any disclaimer, the term of this patent is extended or adjusted under 35 U.S.C. 154(b) by 0 days.

(21) Appl. No.: 15/252,850

(22) Filed: Aug. 31, 2016

(51) Int. Cl.
*F41H 11/02* (2006.01)
*F42B 4/26* (2006.01)
*F41G 7/22* (2006.01)
*F02K 1/82* (2006.01)

(52) U.S. Cl.
CPC ............ *F41H 11/02* (2013.01); *F41G 7/224* (2013.01); *F42B 4/26* (2013.01); *F02K 1/825* (2013.01)

(58) Field of Classification Search
CPC . F41H 11/02; F41H 3/00; F41G 7/224; F02K 1/825; B64D 7/00; F42B 4/26
See application file for complete search history.

(56) References Cited

U.S. PATENT DOCUMENTS

| 4,018,046 A * | 4/1977 | Hurley | B64D 33/04 239/265.19 |
| 7,367,531 B2 * | 5/2008 | Greene | B64D 7/00 244/17.13 |
| 7,370,836 B2 * | 5/2008 | Greene | B64D 7/00 244/17.13 |
| 2005/0138932 A1 * | 6/2005 | Perricone | B64D 33/04 60/772 |
| 2005/0217465 A1 | 10/2005 | Perricone et al. | |
| 2009/0072047 A1 * | 3/2009 | Greene | B64D 33/04 239/127.3 |

FOREIGN PATENT DOCUMENTS

| DE | 19721429 A1 | 11/1998 |
| EP | 2204632 A1 | 7/2010 |
| WO | 2005056384 A2 | 6/2005 |

OTHER PUBLICATIONS

Sengel, Cengiz, "Decoy Effectiveness in a Multiple Ship Environment", Sep. 1988, Naval Postgraduate School, T242343.*
Thompson et al.: "IR Signature Suppression of Modern Naval Ships", ASNE 21st Century Combatant Technology Symposium, p. 1-9, Jan. 27-30, 1998, http://www.davis-eng.com/docs/papers/irss_paper.pdf.
Galle et al.: "Ship Infrared (IR) Signatures", Marineblad, No. 9, Sep. 1998, http://publications.tno.nl/publication/34620103/Rw2TvG/pub95085.pdf. p. 5, 13-17.

* cited by examiner

*Primary Examiner* — Stephen Johnson
*Assistant Examiner* — Joshua T Semick
(74) *Attorney, Agent, or Firm* — W.R. Davis Engineering Limited

(57) ABSTRACT

Systems and methods are provided that employ an IR suppression system to alter the signature of a vessel during a missile engagement with the objective of confusing a seeker of an incoming missile so as to increase the probability that the seeker is seduced by a flare. The flare is launched and IR suppression is enabled or set to an increased level, with coordinated timing, such that the IR signature of the target vessel is changed at about the same time that the flare is launched.

12 Claims, 3 Drawing Sheets

SYSTEM AND METHOD OF COORDINATED INFRARED SUPPRESSION AND FLARE LAUNCH

FIELD

The application relates to systems and methods of infrared suppression.

BACKGROUND AND PRIOR ART

An infrared (IR) seeker is a device within a missile which homes on the IR signature of a target vessel (e.g. a ship, aircraft, etc.), decides whether it has detected a target, and then maintains a lock on the target. All matter emits IR radiation. The IR signature of a target and its surroundings is comprised of an IR signal that is spatially distributed.

The seeker may be part of an anti-ship missile launched outside the visible range of a ship (over horizon) with knowledge of ship's location, from radar or satellite for example. The missile may use Global Positioning System (GPS) guidance for most of its path, and then in the final stage, switch over to radar or IR detection.

Ships can be designed to have stealth in both the radar and IR bands.

An IR seeker can use as its signal: an integration of the IR signal from its field of view into a single number (e.g. if it uses just a single detector); or an image of its field of view (e.g. if it uses a focal plane array).

The seeker attempts to discern the target from the background or other objects in the field of view. This will only be possible once the target is visible, meaning there is a line of sight from the ship to the seeker allowing for altitude and earth curvature. For the purpose of this description, visibility does not equate with detectability. Detection will occur at a time that depends on how strong the signal from the ship is in the atmosphere, and that also depends on noise in the surroundings (sea surface reflections etc.). A seeker which discerns a target with sufficient certainty (e.g. using a signal to noise ratio metric) has "detected" the target.

An example of a simple seeker is one which aims towards the position in space which represents the strongest signal.

A ship may employ IR seeker countermeasures. An example of a countermeasure is a flare (incendiary) which is launched from the ship into the air and presents another possible target to the seeker. A successful flare is one which the seeker chooses to track instead of the ship.

A more sophisticated seeker is one which attempts to identify a space within the field view which encompasses the target. This space is called a "track gate". The seeker can estimate the track gate, and update the track gate continuously using a two dimensional focal array. The seeker may store information about the track gate to increase the probability that the target stays within the track gate as the seeker advances towards the target.

The seeker continues to look for the target, and adapts the track gate to accommodate for the increase in effective size and signal intensity of the target as the distance to the target decreases.

An IR seeker can store information about the intensity of the IR signal within its track gate. This signal intensity changes with time as the distance to the target decreases. Keeping signal intensity in memory can be used by a seeker to reject (i.e. not include within its track gate) signals within its field of view which may not be part of the target.

For example, a seeker which maintains a track gate can reject a flare if its signal intensity is not close enough to what is recorded for the track gate.

If a seeker detects the target, it is likely to reject a flare by use of a track gate. However, if a seeker detects the flare, it is likely to reject the target. That is, the countermeasure is successful. Sometimes the countermeasure will be successful and others not.

It follows that a countermeasure is more likely to be successful if a flare can be launched prior to the seeker detecting the ship, so that the seeker is more likely to detect the flare. In some scenarios (e.g. lower resolution seeker focal plane array, or low observable environment) the distance at which a seeker detects a ship decreases with the decreasing ship IR signature. In these scenarios a low ship IR signature increases the probability that the flare can be launched prior to the ship being detected, and so a low IR signature increases countermeasure effectiveness.

A missile engagement situation in which a flare countermeasure is launched and is detected by the seeker prior to its detecting the ship is called a "distraction" scenario. An engagement situation in which a flare countermeasure is launched after the seeker has detected the ship is called a "seduction" scenario.

The IR signature of a ship is dependent on the environmental conditions and the ships operational state (which engines are running and at what power). In some conditions, the IR signature is low enough that it is likely that the flare can be launched prior to the ship being detected. However, in other conditions it is likely that the ship will be detected prior to the flare being launched. So for a given ship whether an engagement is a distraction or seduction scenario changes with the environmental conditions and the ship's operational state.

Conventional IR suppression systems are configured to reduce IR signature as much as possible either at all times or at times when the ship is under threat.

The conventional IR suppression systems increase the probability versus an unsuppressed ship that the ship will be in a distraction scenario versus a seduction scenario.

The conventional IR suppression systems may also increase the probability that the countermeasure is successful in a seduction scenario, but their effectiveness is limited due to the sophistication possible in the seeker hardware and algorithm, for example, through high resolution focal plane arrays and the use of track gates as described above.

SUMMARY

According to one aspect of the present invention, a method is provided for combined IR suppression and flare launch in a target vessel, the method comprising: performing threat detection to detect the existence of an incoming missile; in response to detecting the incoming missile, launching a flare and enabling IR suppression or increasing a level of IR suppression with coordinated timing such that the IR signature of the target vessel is changed at about the same time that the flare is launched.

According to another aspect of the present invention, there is provided a method for combined IR suppression and flare launch in a target vessel, the method comprising: performing threat detection to detect the existence of an incoming missile; determining whether a seduction scenario or a distraction scenario is occurring; if it is determined that a seduction scenario is occurring, launching a flare and enabling IR suppression or increasing a level of IR suppression with coordinated timing such that the IR signature of the target vessel is changed at about the same time that the flare is launched.

According to yet another aspect of the present invention, there is provided an apparatus comprising: a flare launch control system; a combat control system; a threat detection system; an active IR suppression system; wherein the apparatus is configured to perform any one of the methods summarized above, or described herein.

BRIEF DESCRIPTION OF THE DRAWINGS

Embodiments of the disclosure will now be described with reference to the attached drawings in which.

DETAILED DESCRIPTION

Figure 1:
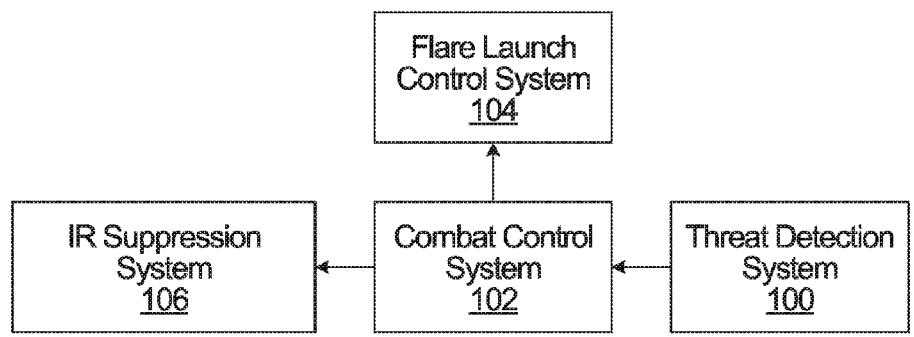
FIG. 1 is a block diagram of a system for coordinated infrared suppression and flare launch provided by an embodiment of the invention.

Embodiments of the invention employ an IR suppression system to alter the signature of a vessel during a missile engagement with the objective of confusing the seeker so as to increase the probability that the seeker is seduced by a flare. While the details that follow are presented for the case where the vessel is a ship, it should be understood that these approaches are equally applicable to other vessel types, such as airplanes and helicopters.

Generally, embodiments of the present disclosure provide systems and methods for coordinated IR suppression and flare launch. For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

Referring now to FIG. 1, shown is a block diagram of a system with coordinated IR suppression and flare launch provided by an embodiment of the invention. Shown is a threat detection system 100 in communication with a combat control system 102. The combat control system 102 is in communication with a flare launch control system 104 and an IR suppression system 106 such as an engine exhaust IR suppression system.

While shown as separate components, the functionality of the combat control system, threat detection system, flare launch control system, and IR suppression system may be integrated into a fewer or larger number of components. Typically, these components include hardware functionality necessary for performing threat detection, launching flares, and suppressing IR, and in addition processing functionality in the form of hardware, or hardware in combination with software, to perform the necessary processing described in detail below.

In operation, the threat detection system 100 conducts ongoing threat detection; once a missile is detected, the threat detection system 100 informs the combat control system 102 of the missile's presence and location. The combat control system 102 commands the flare launch control system 104 to launch one or more flares. The combat control system 102 may command the flare launch control system on the time of launch and the flare profile (e.g. the elevation and direction) for each flare. In coordination with the commanding of the flare launch, the combat control system 102 also commands the IR suppression system 106 to reduce the IR signature of the ship. This can involve enabling the IR suppression system 106, or increasing the level of IR suppression applied by the IR suppression system 106.

In a seduction scenario the seeker has detected the ship and is recording and processing information about the ship signature within its track gate. The track gate encompasses the ship exhaust system and plume and potentially parts of the ship structure. As detailed previously, in a conventional system, the IR suppression system is always on, and there is a high likelihood that after a flare is launched, the seeker would use the track gate information to reject the flare. However, with the coordinated approach provided in this embodiment, the IR suppression system is enabled in coordination with the flare launch, with the result that ship signature is suddenly changed so that it is inconsistent with the seeker track gate information. The seeker is forced to now choose between the reduced ship signature and the flare signature. The flares, and the IR suppression system are configured such that the flare presents a stronger IR signature than the ship when the IR suppression system is enabled. Thus, by launching the flare in coordination with enabling the IR suppression system, the flare presents a stronger signature, and there is an enhanced probability that the seeker detects the flare, such that the track gate subsequently records and processes information on the flare, at least compared to the corresponding probability within a system in which the IR signature presented by the ship is the same both before and after flare launch.

In some embodiments, the IR suppression system is a water injection system which cools the exhaust plume through the evaporation of water droplets. In such embodiments, enabling the IR suppression system involves turning on the water injection system. In some embodiments, the IR suppression system may make use of engine operational state information to control the amount of water injected since in order to minimize the IR signature of an exhaust plume there is an optimal mass flow of injected water for a given mass flow and temperature of exhaust gas.

In some embodiments, the IR suppression system is a variable geometry air-to-air ejector, which through a change in ejector geometry can increase the cooling of the exhaust gas by mixing in more cool ambient air.

In some embodiments, the IR suppression system is an IR suppression system with at least three levels of IR suppression including a minimum level, an intermediate level and a maximum level. For example, the IR suppression system may be an air-to-air ejector with three states: one of which is most open; the second of which is partially closed; and the third of which is in its most closed position. The level of IR suppression increases from the most open position to the most closed position. In some embodiments, the geometry of the air-to-air ejector and the corresponding level of IR suppression is achieved by controlling the nozzle of the air-to-air ejector.

Other active measures may alternatively be used as long as the signature can be modified in a short period of time (for example on the order of seconds). A water washdown system that sprays a ship with sea water can also be used to reduce the ship's signature during a threat situation.

There may also be passive measures employed on an ongoing basis. For example, in some embodiments, the ship's skin is covered with low solar absorptive paint.

As discussed above, the timing of the flare launch is coordinated with the timing of enabling IR suppression or increasing the level of IR suppression such that the IR signature of the target vessel is changed at about the same time that an initial flare is launched. There may be multiple flares that are launched at the same time as the initial flare, or following the launch of the initial flare. The exact timing can be determined on an implementation specific basis and/or scenario specific basis. In some embodiments, the IR suppression system is enabled slightly before flare launch. In some embodiments, the IR suppression system is enabled or set to an increased level of IR suppression at the same time as flare launch, and in some embodiments, the IR suppression system is enabled shortly after flare launch.

In some embodiments, once enabled/set to an increased IR suppression level, the IR suppression system is kept on until the missile is defeated, and optionally is turned off after the missile is defeated.

Figure 2:
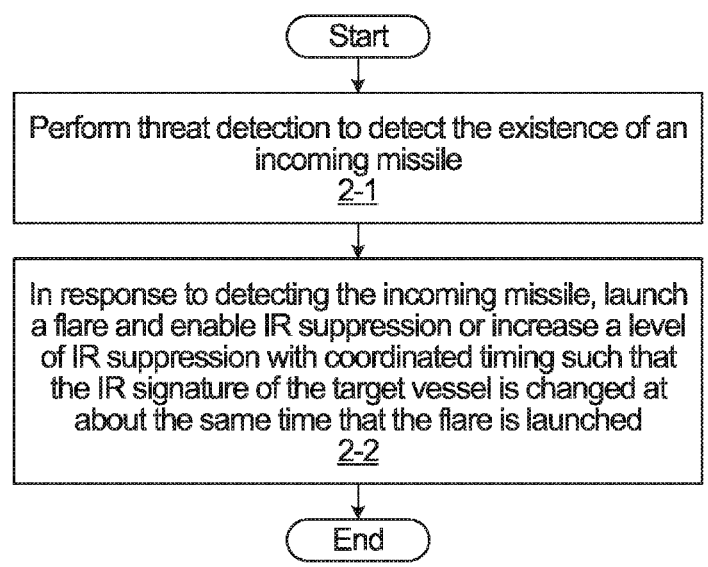
FIG. 2 is a flowchart of a method for coordinated infrared suppression and flare launch provided by an embodiment of the invention.

Referring now to FIG. 2, shown is a flowchart of a method for combined IR suppression and flare launch in a target ship provided by an embodiment of the invention. The method may, for example, be performed using a system such as that of FIG. 1. In block 2-1, threat detection is performed to detect the existence of an incoming missile. In block 2-2, in response to detecting the incoming missile, a flare is launched and IR suppression is enabled or a level of IR suppression is increased with coordinated timing such that the IR signature of the target ship is changed at about the same time that the a flare is launched.

Figure 3:
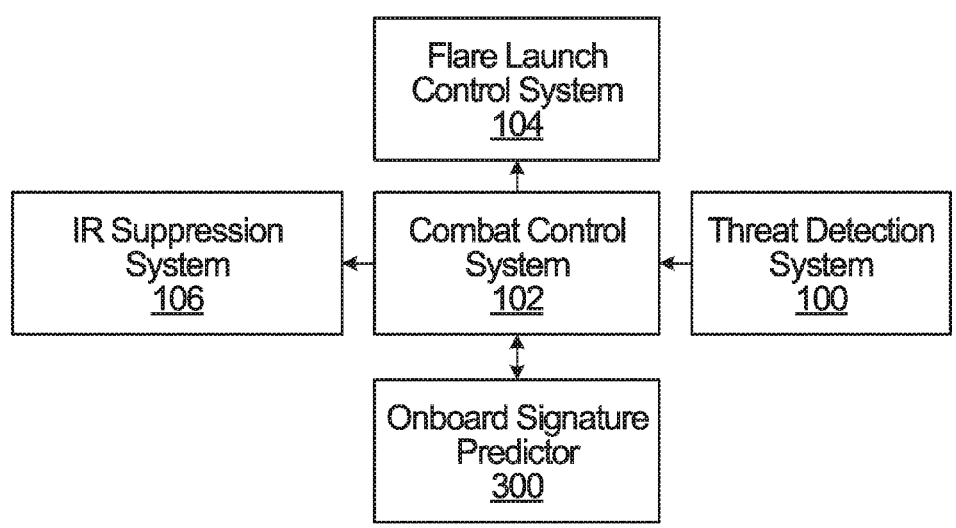
FIG. 3 is a block diagram of another system for coordinated infrared suppression and flare launch provided by an embodiment of the invention featuring an onboard signature predictor.

Referring now to FIG. 3, shown is a block diagram of a system with coordinated IR suppression and flare launch provided by another embodiment of the invention. The embodiment of FIG. 3 is similar to that of FIG. 1, and includes in addition to the components of FIG. 1, an onboard signature predictor 300 in communication with the combat control system 102. The elements 100,102,104, 106 are the same as in the FIG. 1 embodiment with the exception that the combat control system 102 is configured to receive, process and act upon an input from the onboard signature predictor 300 as discussed below.

The onboard signature predictor 300 can be used to make an a priori assessment (i.e. prior to awareness of a missile engagement) based on current environment conditions and operational state whether to set the IR suppression system for a seduction scenario or for a distraction scenario. Alternatively, or in addition, the onboard signature predictor 300 can be used to assess for a detected missile whether an actual engagement is a distraction scenario or a seduction scenario. An example of an approach that combines both of these techniques is detailed below with reference to the flowchart of FIG. 4. The description of FIG. 3 that follows assumes that the onboard signature predictor 300 is only used to make an assessment after detecting a missile, but it should be clearly understood that it can also, or alternatively be used to make an a priori assessment.

In operation, after a missile is detected by the threat detection system 100, the onboard signature predictor 300 predicts whether in the current environmental conditions and operational state a missile engagement will be a seduction scenario or alternatively a distraction scenario and conveys this prediction to the combat control system 102.

In some embodiments, the onboard signature predictor predicts detectability, in terms of distance to detection (i.e. a seeker will detect the ship within this distance) for any vantage point around the ship. Depending on this distance, the seduction vs. distraction scenario distinction can be drawn. In some embodiments, the combat control system 102 informs the onboard signature predictor 300 of the location of a detected missile in terms of distance and direction. If the distance to the detected missile is greater than the distance to detection for that direction, then there is a distraction scenario. If the distance to the detected missile is less than the distance to detection for that direction, then there is a seduction scenario. Note that there can be a seduction scenario in one direction, and distraction in another. This result can be determined by performing a calculation or table look up on an as needed basis.

For a distraction scenario, the combat control system 100 positions the IR suppression system 106 to a highest level of IR suppression, and the flare launch occurs uncoordinated with the IR suppression system. Ideally, the IR suppression system 105 is switched to the highest level as soon as the distraction scenario is determined. However, there may be some tolerance in this that depends on how early the ship is able to make the assessment.

For a seduction scenario, the IR suppression system is immediately switched to the lowest level of IR suppression and then at a later time is switched to a position with a highest level of IR suppression (so as to maximize the change in the IR signature of the exhaust plume) in coordination with flare launch as described above for the first embodiment.

The onboard signature predictor 300 may, for example be implemented as a software module executed on a computing platform, which uses real-time information about the environmental conditions (e.g. time of day, day of year, air temperature, sea temperature, humidity, wind speed, etc.) and ship operating state (e.g. engine states, ship heading and speed) to predict the range at which a seeker will detect the ship from a given angle.

In some embodiments, when the combat control system 102 learns of the presence of the missile, it requests the onboard signature predictor 300 for the detection range given the current missile position. From this information, the combat control system can then decide whether to: immediately enable the IR suppression system 100 (distraction scenario); or disable the IR suppression system and then fully enable the IR suppression system in coordination with the flare launch (seduction scenario).

Figure 4:
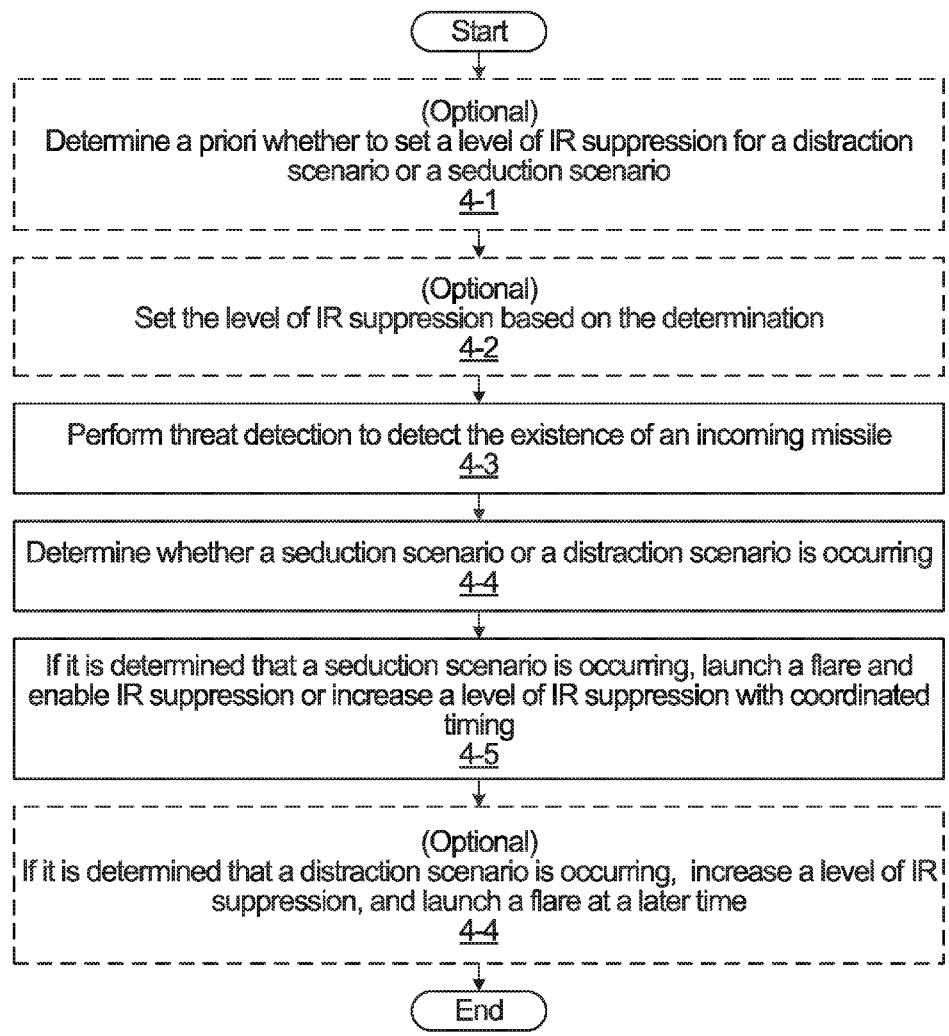
FIG. 4 is a flowchart of a method for coordinated infrared suppression and flare launch provided by an embodiment of the invention featuring the use of signature prediction.

Referring now to FIG. 4, shown is a flowchart of another method for combined IR suppression and flare launch in a target ship. This method might, for example, be performed with a system such as depicted in FIG. 3. The method includes optional steps 4-1,4-2 that concern setting the level of IR suppression a priori, and steps 4-2-4-6 that concern setting the level of IR suppression after missile detection. The method begins in block 4-1 with determining a priori (i.e. prior to awareness of a missile engagement) whether to set the level of IR suppression to be for a distraction scenario or a seduction scenario, based on the current environmental conditions and operational state. This might be done, for example, based on relative probability that a missile engagement is likely to be a seduction scenario as opposed to a distraction scenario. In block 4-2, the level of IR suppression is set based on the determination made in block 4-1. To set operational conditions for a distraction scenario, the level of IR suppression is positioned a priori in the intermediate level, and to set operational conditions for a seduction scenario, the level of IR suppression is positioned a prior to a lowest level.

The method continues in block 4-3 with performing threat detection to detect the existence of an incoming missile. In block 4-4, it is determined whether a seduction scenario or a distraction scenario is occurring. In block 4-5, if it is determined that a seduction scenario is occurring, the IR suppression system is disabled (or set to the lowest level of IR suppression), and at a later time a flare is launched and IR suppression is increased (for example set to the highest level of IR suppression) with coordinated timing such that the IR signature of the target ship is changed at about the same time that the a flare is launched. Optionally, if it is determined that a distraction scenario is occurring, in block 4-6 IR suppression is increased (for example set to a position with the highest level of IR suppression), and at a later uncoordinated time a flare is launched.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

The invention claimed is:

1. A method for combined IR suppression and flare launch in a target vessel, the method comprising:
    determining whether to set operating conditions for a seduction scenario or for a distraction scenario;
    if determined to set operating conditions for a seduction scenario, operating an air-to-air ejector in a fully opened position; or
    if determined to set operating conditions for a distraction scenario, operating the air-to-air ejector in a partially closed position;
    performing threat detection to detect the existence of an incoming missile;
    in response to detecting the incoming missile, launching a flare and enabling IR suppression or increasing a level of IR suppression with coordinated timing such that an IR signature of the target vessel is changed at about the same time that the flare is launched; and
    wherein enabling IR suppression or increasing a level of IR suppression comprises switching the air-to-air ejector to a fully closed position.

2. The method of claim 1 wherein launching the flare and enabling IR suppression or increasing a level of IR suppression with coordinated timing comprises launching the flare and enabling IR suppression or increasing a level of IR suppression substantially simultaneously.

3. The method of claim 1 wherein enabling IR suppression or increasing a level of IR suppression comprises reconfiguring an air-to-air ejector to a higher level of IR suppression.

4. The method of claim 3 wherein reconfiguring an air-to-air ejector comprises controlling a nozzle of the air-to-air ejector to be in a most closed state.

5. The method of claim 1 wherein enabling IR suppression or increasing a level of IR suppression comprises turning on a water injection system.

6. A method for combined IR suppression and flare launch in a target vessel, the method comprising:
    performing threat detection to detect the existence of an incoming missile;
    determining whether a seduction scenario or a distraction scenario is occurring;
    in a seduction scenario, launching a flare and enabling IR suppression or increasing a level of IR suppression with coordinated timing such that an IR signature of the target vessel is changed at about the same time that the flare is launched;
    in a distraction scenario, increasing a level of IR suppression, and launching the flare at a later time uncoordinated with enablement or IR suppression level increase of the IR suppression system.

7. The method of claim 6 wherein determining whether a seduction scenario or a distraction scenario is occurring comprises:
    estimating a distance from the incoming missile to the target vessel;
    predicting a range of detectability of the target vessel to the incoming missile;
    based on the estimated distance and the predicted range of detectability of the vessel to the missile, if the missile is inside the range of detectability, determining a seduction scenario is occurring, and if the missile is outside the range of detectability determining a distraction scenario is occurring.

8. The method of claim 7 wherein predicting the range of detectability is performed as a function of information about environmental conditions and vessel operating state to predict a range at which a seeker will detect the vessel from a given angle.

9. The method of claim 7 wherein enabling IR suppression or increasing a level of IR suppression comprises reconfiguring an air-to-air ejector by controlling a nozzle of the air-to-air ejector to be in a most closed state.

10. The method of claim 6 further comprising:
    prior to detecting the existence of the incoming missile, determining whether to set operating conditions for a seduction scenario or for a distraction scenario;
    based on the determining:
    to set operating conditions for a seduction scenario, operating an air-to-air ejector in a fully opened position; or
    to set operating conditions for a distraction scenario, operating the air-to-air ejector in a partially closed position;
    after detecting the existence of the incoming missile, if it is determined that a seduction scenario is occurring, said launching the flare and enabling IR suppression or increasing a level of IR suppression with coordinated timing such that an IR signature of the target vessel is changed at about the same time that the flare is launched comprising launching the flare and switching the air-to-air ejector to a fully closed position;
    after detecting the existence of the incoming missile, if it is determined that a distraction scenario is occurring, substantially immediately switching the air-to-air ejector to a fully closed position and launching a flare at a later time uncoordinated with switching the air-to-air ejector to the fully closed position.

11. An apparatus comprising:
    a flare launch control system;
    a combat control system;
    a threat detection system;
    an active IR suppression system;

the apparatus having software stored thereon, wherein the software includes computer executable code for performing the steps of claim 1.

12. An apparatus comprising:
a flare launch control system;
a combat control system;
a threat detection system;
an active IR suppression system;
an onboard signature predictor;
the apparatus having software stored thereon, wherein the software includes computer executable code for:
performing threat detection to detect the existence of an incoming missile;
determining whether a seduction scenario or a distraction scenario is occurring;
in a seduction scenario, launching a flare and enabling IR suppression or increasing a level of IR suppression with coordinated timing such that an IR signature of the target vessel is changed at about the same time that the flare is launched.

\* \* \* \* \*